United States Patent
Chan et al.

(10) Patent No.: US 10,591,646 B2
(45) Date of Patent: Mar. 17, 2020

(54) INFRARED ANTI-REFLECTION FILM STRUCTURE

(71) Applicant: National Chung-Shan Institute of Science and Technology, Taoyuan (TW)

(72) Inventors: Shih-Hao Chan, New Taipei (TW);
Shiang-Feng Tang, Taoyuan (TW);
Shao-Ze Tseng, Kaohsiung (TW);
Kun-Chi Lo, Taoyuan (TW);
Sheng-Hui Chen, Hsinchu (TW);
Wen-Jen Lin, Taoyuan (TW)

(73) Assignee: National Chung-Shan Institute of Science and Technology, Taoyuan (TW)

( * ) Notice: Subject to any disclaimer, the term of this patent is extended or adjusted under 35 U.S.C. 154(b) by 0 days.

(21) Appl. No.: 15/847,925

(22) Filed: Dec. 20, 2017

(65) Prior Publication Data

US 2019/0187334 A1 Jun. 20, 2019

(30) Foreign Application Priority Data

Dec. 18, 2017 (TW) .............................. 106144327 A

(51) Int. Cl.
*G06K 7/10* (2006.01)
*G02B 1/115* (2015.01)
*G02B 1/113* (2015.01)

(52) U.S. Cl.
CPC .............. *G02B 1/115* (2013.01); *G02B 1/113* (2013.01)

(58) Field of Classification Search
CPC ........ G02B 5/285; G02B 5/28; G02B 5/0294;
G02B 5/0278; G02B 5/045; G02B 6/29358; G02B 1/11; G02B 1/111; G02B 1/118; G02B 1/115; G02B 1/116; G02B 1/12; G02B 1/14; G02B 1/16; G02B 1/10; G02B 1/105; G02B 1/113; G02F 1/133502; G02F 2202/022; G02F 2202/023; G02F 2202/16; G02F 2202/22; B32B 27/00–42; B29D 7/01; B29D 11/0073; B29C 47/0038;
(Continued)

(56) References Cited

U.S. PATENT DOCUMENTS

2006/0029815 A1* 2/2006 Woodruff ............ C03C 17/3417
428/426
2006/0240232 A1* 10/2006 Faris ...................... G02B 1/111
428/212

(Continued)

*Primary Examiner* — Stephone B Allen
*Assistant Examiner* — Jyotsna V Dabbi
(74) *Attorney, Agent, or Firm* — Winston Hsu

(57) ABSTRACT

An infrared anti-reflection film structure, an anti-reflection film layer, including a material of zinc oxide, comprising a top anti-reflection film layer and a bottom anti-reflection film layer, wherein the top anti-reflection film layer is disposed on a top side of the base material and the bottom anti-reflection film layer is disposed on a bottom side of the base material; and the base material is manufactured by a floating zone crystal growth method. Through the silicon base material manufactured by the high purity crystal growth method, the silicon base material replaces germanium as the high refractive index material and base material. And coating the anti-reflection film layer on the surface of the silicon base material, so as to apply the infrared anti-reflection film structure to the thermal imaging technology.

3 Claims, 4 Drawing Sheets

(58) Field of Classification Search
CPC ........ B31F 1/07; C08J 5/18; C08J 7/04; C08J 7/042; C08J 7/047; C08J 2367/02; C08J 2383/04; C08J 2383/06; C08J 2483/04; C08J 2483/08; C09D 183/04; C09D 183/08; C08G 77/04; C08G 77/22; C08G 77/24
USPC ....... 359/577, 580, 581, 585, 586, 588, 589, 359/601, 350, 359; 428/156, 174
See application file for complete search history.

(56) References Cited

U.S. PATENT DOCUMENTS

| | | | |
|---|---|---|---|
| 2006/0245036 A1* | 11/2006 | Neidrich | G02B 26/0841 359/292 |
| 2009/0142602 A1* | 6/2009 | Medwick | C03C 17/36 428/428 |
| 2012/0176668 A1* | 7/2012 | Saito | G02B 1/04 359/357 |

* cited by examiner

INFRARED ANTI-REFLECTION FILM STRUCTURE

BACKGROUND OF THE INVENTION

1. Field of the Invention

This present invention relates to an anti-reflection film structure, and more particularly, to an infrared anti-reflection film structure.

2. Description of the Prior Art

Infrared in the prior art possesses strong transmittance and is able to be applied in a great variety of aspects, such as communication, medical, probing, military, etc. For applications not related to the atmospheric window, the infrared is usually utilized in a gas sensor to sense the absorption wavelengths of particular gases and further determine whether there is gas leaking according to the gas concentration. If the infrared is applied in an imaging system, the selected wavelength of the infrared is usually between 8 micrometers and 15 micrometers because the infrared within the waveband needs no further irradiation and can be used at room temperature without additional cooling processes to suppress noise. Moreover, the peak of the black body radiation wavelength from a human is around 10 micrometers; thus, the infrared is able to be applied to military purposes of shooting combat for a single soldier at night, and for the purposes of people's livelihood, the infrared can be applied to vision assistance on automobile electronics at night, for example, auto-piloting.

During the designing process of an infrared system in the prior art, effects of the component reflection or absorption need to be considered. In order to ensure that the infrared with enough energy enters the sensor and to avoid interferences from visible light or the light from other wavelengths to further degrade the image quality, a spectral filter is required and disposed in front of the sensor to pass the infrared and filter out the visible light or the light from other wavelengths. However, current materials utilized for the spectral filter have low transmittance in the thermal imaging waveband, wherein the light is usually about 60% left after passing through the spectral filter. Therefore, there is necessity to further increase the infrared transmittance through an anti-reflection film.

The common materials for the anti-reflection film are affected by heat and decompose during the film coating process, resulting in that the anti-reflection film layer may absorb the infrared light. Taking sulphide and selenide as examples, during the film coating process, the stability of the compounds is hard to control, such that when using these two compounds for the applications of the infrared light within the waveband, absorption of the materials themself and the dopants and the scattering effect between the layers may cause the decrease of the transmittance. As known from theories, the high refractive index material possesses a high absorption rate than the low refractive index material since the short wavelength limit moves to long wavelength. Therefore, the long wavelength limit moves to high wavelength, such that the transparent region for the high refractive index material falls into infrared wavelength. For the compound materials, the molecular mass is large and the ionic nature decreases, such that the wavelength limit moves to long wavelength.

When choosing high refractive index material, germanium (Ge) and silicon (Si) are usually selected, where germanium is commonly selected. Although the refractive index of germanium causes higher reflective index than other materials, germanium possesses larger transparent region in the mid and long infrared waveband. Therefore, through proper arrangements with low refractive index material, a long infrared anti-reflection film may be coated. Silicon is an ideal material utilized for short infrared film coating, but the transmittance is not ideal when utilized for the thermal imaging in which the wavelength is between 8 micrometers and 15 micrometers. Therefore, the thermal imaging system rarely uses the silicon to form the anti-reflection film layer or as the base material, but uses germanium with higher cost.

Therefore, for low refractive index materials, developing other materials suitable for the thermal imaging is a significant objective in the field. Despite the consideration that the low refractive index material must possess higher transmittance to the far infrared light, other considerations such as cost, stability of manufacturing process and less environmental harm must be taken into account; for the high refractive index materials or the base materials, although the transmittance of silicon to the far infrared is lower than the transmittance of germanium to the far infrared, comparing to germanium, the price of silicon is cheaper and easier to be accessed. If the problem of higher absorption rate of silicon to the infrared with 9-micrometer wavelength is solved, the requirements of easily accessed and less environmental harm can be achieved which further benefits the development of related technologies.

SUMMARY OF THE INVENTION

Given the shortcomings of the prior art, it is therefore a primary objective of the present invention to provide an infrared anti-reflection film structure, an anti-reflection film layer, comprising a material of zinc oxide, comprising a top anti-reflection film layer and a bottom anti-reflection film layer, wherein the top anti-reflection film layer is disposed on a top side of the base material and the bottom anti-reflection film layer is disposed on a bottom side of the base material; wherein the base material is manufactured by a floating zone crystal growth method. Through the silicon base material manufactured by the high purity crystal growth method, the silicon base material replaces germanium as the high refractive index material and base material, and coating the anti-reflection film layer on the surface of the silicon base material, so as to apply the infrared anti-reflection film structure to the thermal imaging technology.

To achieve the above object according to the present invention, an infrared anti-reflection film structure is provided, comprising: a base material, formed by silicon; and an anti-reflection film layer, comprising a material of zinc oxide, comprising a top anti-reflection film layer and a bottom anti-reflection film layer, wherein the top anti-reflection film layer is disposed on a top side of the base material and the bottom anti-reflection film layer is disposed on a bottom side of the base material; wherein the base material is manufactured by a floating zone crystal growth method.

The infrared anti-reflection film structure of the present invention, wherein the anti-reflection film layer is a single layer of zinc oxide.

The infrared anti-reflection film structure of the present invention, wherein the anti-reflection film layer is formed by a plurality of zinc oxide layers and a plurality of high refractive index material layers, and the plurality of zinc oxide layers and the plurality of high refractive index material layers stack alternatively.

The infrared anti-reflection film structure of the present invention, wherein a material of the plurality of high refractive index material layers is silicon, germanium or gallium arsenide.

The infrared anti-reflection film structure of the present invention, wherein a thickness of the anti-reflection film layer is between 2 micrometers to 4.5 micrometers.

The above summary and the following detailed description and accompanying drawings, all in order to further illustrate the present invention to achieve the intended purpose are taken, means and effects. Such other objects and advantages of the invention will be set forth in the subsequent description and the accompanying drawings.

These and other objectives of the present invention will no doubt become obvious to those of ordinary skill in the art after reading the following detailed description of the preferred embodiment that is illustrated in the various figures and drawings.

DETAILED DESCRIPTION

The following illustrates specific embodiments of the present invention, and those skilled in the art can readily understand advantages and efficacy of the present invention accordingly.

The present invention discloses an infrared anti-reflection film structure, capable of coating the anti-reflection film on silicon base material by an e-gun coater and a method of ion-beam-assisted deposition (IAD) to manufacture multiple layers of an anti-reflection film, specific to the thermal imaging infrared waveband; using the silicon base material manufactured by a floating zone (FZ) crystal growth method to replace germanium as the high refractive index material and the base material.

The present invention utilizes nontoxic zinc oxide (ZnO) as a low refractive index material of the anti-reflection film layer, utilizes germanium, silicon or gallium arsenide as the high refractive index material of the anti-reflection film layer, and coats the high and low refractive index materials on the silicon base material through the design from the equivalent admittance theory. When the anti-reflection film layer comprises the multiple high and low refractive index materials, the structural parameters of each layer, such as thickness, proportion and incident light angle, etc. must be analyzed by a Macleod software based on Maxwell equation to simulate optical characteristics of the optical film system with multiple layers so as to obtain the best structural parameter.

Figure 3:
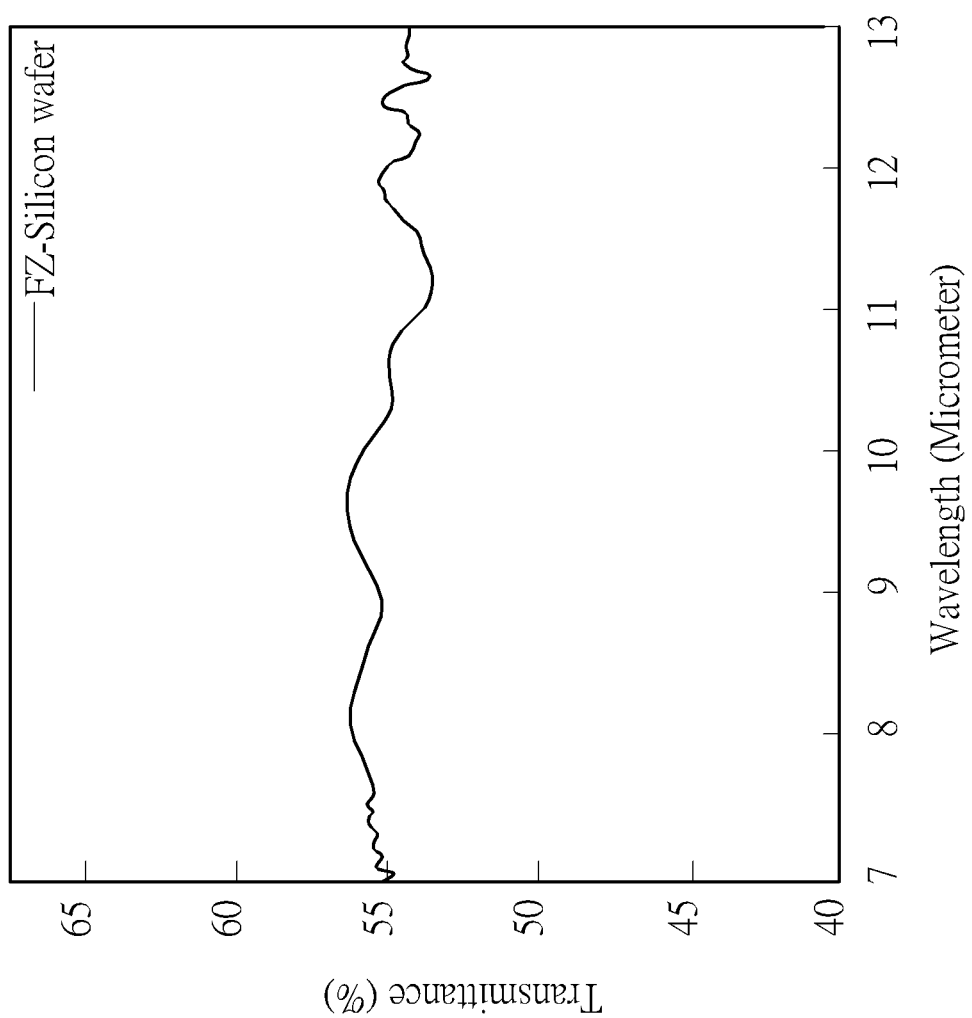
FIG. 3 is a schematic diagram of transmittance versus wavelength of silicon base material according to an embodiment of the present invention.

Silicon is used for a light window to pass the infrared, and is required to be as pure as possible, so as to prevent insufficient light response signal of the thermal image due to impurities of silicon and unnecessary infrared absorption. To manufacture a high purity silicon base material, the floating zone crystal growth method is utilized. First, a polysilicon bar comprising dopant is manufactured by molding. After the seed crystal is melt and bonded to the lower end of the bar, the radio-frequency heating coil moves upward along the axis so as to melt the polysilicon bar again and the atomic arrangement direction is rearranged according to the seed crystal direction. Through the floating zone crystal growth method, the single crystal ingot with very low oxygen content (lower than $10^{17}$ atoms/cm$^3$) may be manufactured. For the problem of the silicon base material possessing high absorption rate within the long infrared of 9-micrometer wavelength, the present invention provides a silicon base material manufactured by the floating zone crystal growth method as the silicon base material (FZ-Si). The silicon material manufactured by the floating zone crystal growth method has higher purity of silicon and less impurities, such that the high absorption rate within the long infrared of 9-micrometer wavelength can be prevented. Please refer to FIG. 3, which is a schematic diagram of transmittance versus wavelength of silicon base material according to an embodiment of the present invention. FIG. 3 illustrates the infrared transmittance test result of the silicon base material manufactured by the floating zone crystal growth method (FZ-Si), where the vertical axis is the transmittance and the horizontal axis is the light wavelength (the unit is in micrometer). As can be seen, the silicon base material possesses transmittance rate higher than 50% within the long infrared wavelength (8 micrometers to 15 micrometers wavelength).

The zinc oxide is transparent to the long infrared (8 micrometers to 15 micrometers wavelength), which possesses good transmittance from visible light to the infrared. According to the statistical data in the prior art, the zinc oxide material has high transmittance rate when the wavelength is between 5 micrometers and 18 micrometers; the zinc oxide has high absorption rate when the wavelength is between 20 micrometers and 25 micrometers; the transmittance rate rises again when the wavelength is over 25 micrometers. Therefore, the zinc oxide has good transparency (over 70% of transmittance) within the infrared waveband.

To suppress the background radiation, the transmittance rate of the thermal radiation signal must be elevated, which may be performed by adopting the concept of the equivalent admittance. In other words, the structure of stacking the anti-reflection film on the base material may be represented as a new equivalent admittance, which brings huge advantage when designing the anti-reflection film layer; assuming that the refractive index of the incident medium is $y_0$, and the refractive index of the base material is $y_s$. A thermal spraying layer is formed on the base material where the refractive index is y and the thickness is d. The base material and the thermal spraying layer may be replaced by a single layer in the representation of equivalent admittance Y, which can be obtained from the following equation:

$$\begin{bmatrix} B \\ C \end{bmatrix} = \begin{bmatrix} \cos\delta & \frac{1}{y}\sin\delta \\ iy\sin\delta & \cos\delta \end{bmatrix} \begin{bmatrix} 1 \\ y_s \end{bmatrix}. \tag{1}$$

Where $$\delta = \frac{2\pi}{\lambda} yd \cos\theta, \text{ and } Y = \frac{C}{B} = \alpha + \beta i.$$

Expand eq. 1 and take the real parts equal and the imaginary parts equal, so as to obtain:

$$(\alpha - y_s)\cos\delta = \frac{\beta y_s}{y}\sin\delta; \beta\cos\delta = \left(y - \frac{y_s}{y}\alpha\right)\sin\delta. \quad (2)$$

To elevate the transmittance rate of the thermal radiation signal, the equivalent admittance track of the thermal spraying starts from the base material $y_s$ and ends at the incident medium $y_0$, such that the reflection of the thermal radiation signal in the anti-reflection film structure is zero. If the equivalent admittance Y of the thermal spraying (refractive index is y) equals $y_0$, i.e.

$$Y = \frac{y^2}{y_s} = Y_0,$$

there are two conditions for the thermal spraying to become the anti-reflection film layer:
(1) the refractive index $y=\sqrt{y_0 y_s}$, (2) the film thickness $$nd = \frac{1}{4}\lambda_0.$$

The thicknesses of the anti-reflection film layer designed according to the above embodiments are all quarter wavelength. When the anti-reflection film layer is applied to the applications of 5 micrometers to 18 micrometers wavelength, the thickness of the anti-reflection film can range from 2 micrometers to 4.5 micrometers, which is easier to calculate for operating the evaporation, but restrains the choices of the material. Therefore, in practical, it is not necessary to design the thickness of the anti-reflection film layer by quarter wavelength, but improves the characteristic of the film with even more layers of the film. The characteristic of the anti-reflection film layer can suppress the waveband beyond the thermal radiation waveband and increase the optical transmittance within the thermal radiation waveband.

Figure 4:
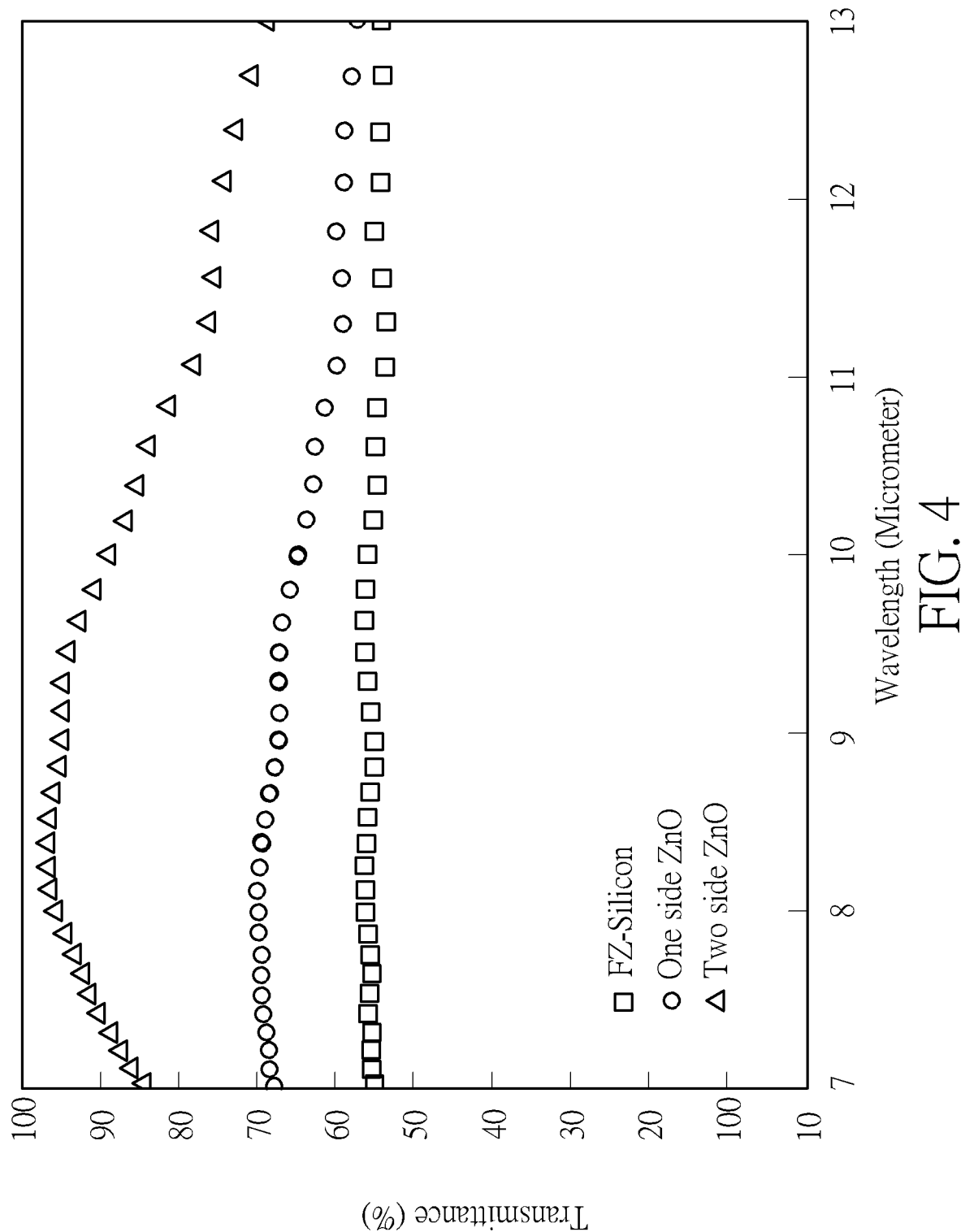
FIG. 4 is a schematic diagram of transmittance versus wavelength of the silicon base material according to the embodiment of the present invention.

Please refer to FIG. 4, which is a schematic diagram of transmittance of the silicon base material according to the embodiment of the present invention. FIG. 4 illustrates the transmittance of the silicon base material (FZ-Si) manufactured by the floating zone crystal growth method, the transmittance of the FZ-Si with the zinc oxide formed on one side of the FZ-Si, and the transmittance of the FZ-Si with the zinc oxide formed on two sides of the FZ-Si. The horizontal axis is the transmittance and the vertical axis is the wavelength of light (the unit is in micrometers), wherein the squares represent the transmittance of the FZ-Si base material; the circles represent the transmittance of forming the zinc oxide anti-reflection film layer on one side of the FZ-Si base material; the triangles represent forming the zinc oxide anti-reflection film layer on both sides of the FZ-Si base material. As can be seen, the transmittance of the FZ-Si base material to infrared with 9-micrometer wavelength increases substantially. In addition, after coating the zinc oxide on the FZ-Si base material (including coating on one side and on both sides), the transmittance of the FZ-Si to the long infrared is increased, such that the FZ-Si base material is able to be applied in the thermal imaging system application and to be used as the atmospheric viewing window or the structure of a mask.

Figure 1:
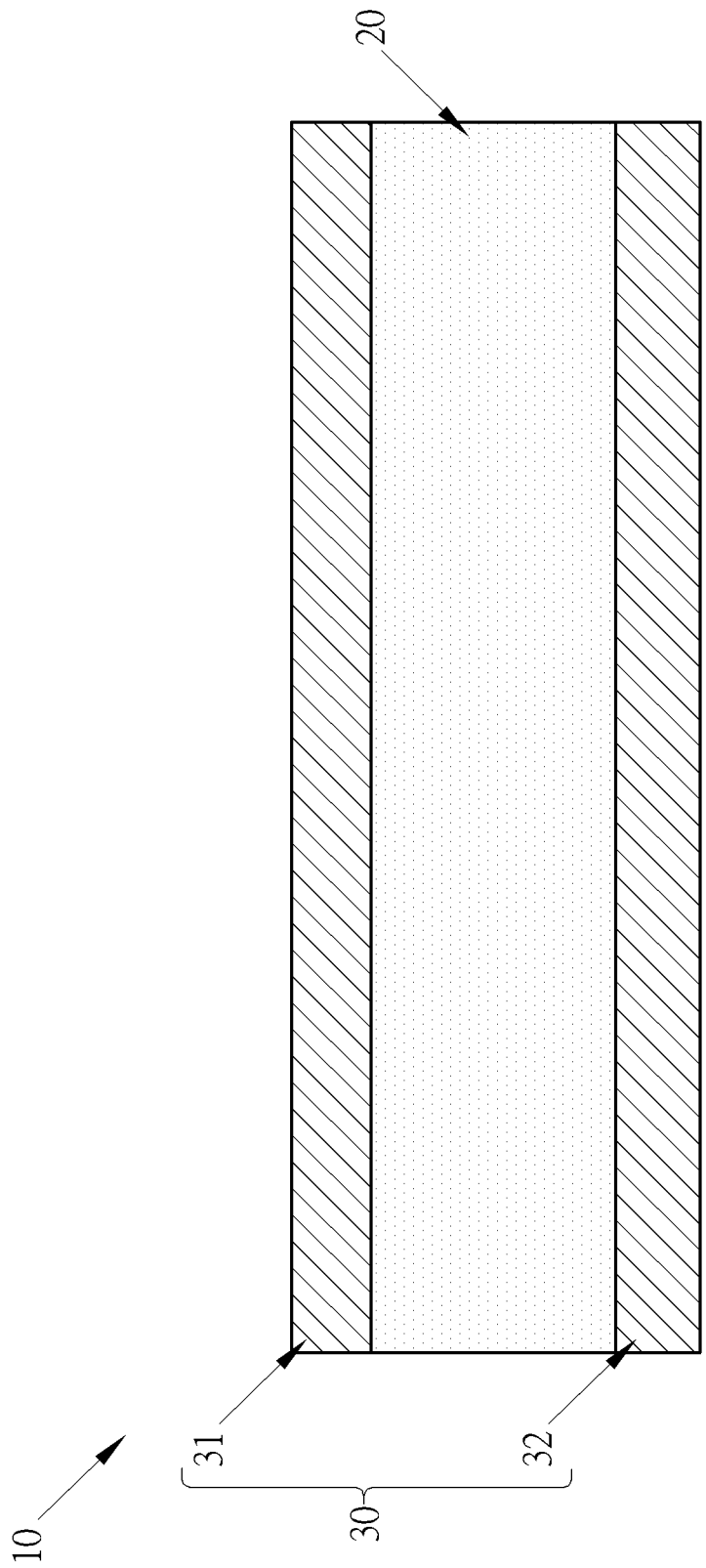
FIG. 1 is a schematic diagram of an infrared anti-reflection film structure according to an embodiment of the present invention.

Please refer to FIG. 1, which is a schematic diagram of an infrared anti-reflection film structure 10 according to an embodiment of the present invention. The infrared anti-reflection film structure 10 comprises a base material 20 and an anti-reflection film layer 30, wherein the anti-reflection film layer 30 comprises a top anti-reflection film layer 31 and a bottom anti-reflection film layer 32. The top anti-reflection film layer 31 is disposed on the top side of the base material 20 and the bottom anti-reflection film layer 32 is disposed on the bottom side of the base material 20, but the present invention is not limited herein. Moreover, the anti-reflection film layer 30 may comprise the top anti-reflection film layer 31 or the bottom anti-reflection film layer 32 only. The anti-reflection film layer 30 may be coated on the base material 20 by the e-gun coater and the method of ion-beam-assisted deposition. The material of the base material 20 may be a silicon base material manufactured by the floating zone crystal growth method or other manufacturing methods for manufacturing the high purity silicon base materials. The material of the anti-reflection film layer 30 may be the zinc oxide.

Figure 2:
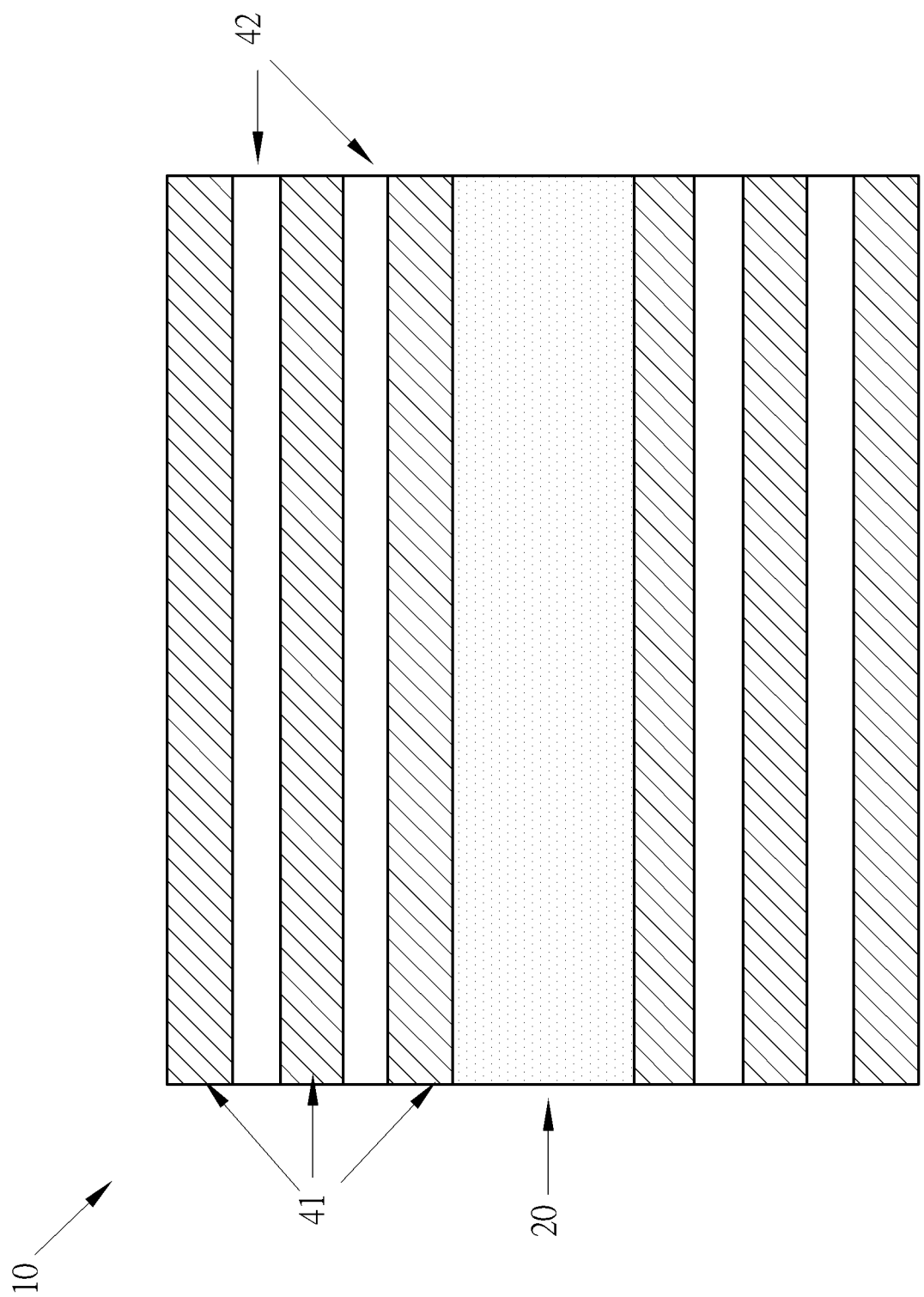
FIG. 2 is a schematic diagram of an infrared anti-reflection film structure according to another embodiment of the present invention.

Please refer to FIG. 2, which is a schematic diagram of an infrared anti-reflection film structure 10 according to another embodiment of the present invention. The infrared anti-reflection film structure 10 comprises a base material 20 and an anti-reflection film layer, wherein the anti-reflection film layer comprises a top anti-reflection film layer and bottom anti-reflection film layer. The top anti-reflection film layer is disposed on the top side of the base material 20 and the bottom anti-reflection film layer is disposed on the bottom side of the base material 20, wherein the top anti-reflection film layer comprises multiple zinc oxide layers 41 and multiple high refractive index material layers 42, and the zinc oxide layers 41 and the high refractive index material layers 42 stack alternatively. The bottom anti-reflection film layer is also formed by multiple zinc oxide layers and multiple high refractive index material layers, and the zinc oxide layers and the high refractive index material layers stack alternatively. The material of the zinc oxide layers 41 is ZnO, the material of the high refractive index material layers 42 may be silicon, germanium or gallium arsenide.

To manufacture the infrared anti-reflection film, if the material for manufacturing is toxic, such as selenide or sulphide, dedicated facilities or machines are required for manufacturing the infrared anti-reflection film, which cannot be used for manufacturing other films or the other films would be polluted. Moreover, sulphide and selenide may generate toxic gas when reacted with the hydrogen gas, which is harmful to the human body and further increases the danger of the manufacturing process. Therefore, the present invention provides to use the zinc oxide which is less harmful to the human body and the environment to replace the common materials of selenide and sulphide. In addition, the silicon manufactured by the high purity crystal growth method (FZ-Si) replaces germanium as the high refractive index material and the base material; in summary, the present invention provides an infrared anti-reflection film structure to meet the requirements of easy access and less environmental harm, which further benefits the development of related technologies.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An infrared anti-reflection film structure, comprising:
a base material, formed by silicon; and
a top anti-reflection film layer formed on a top surface of the base material, consisting of:
   a first zinc oxide layer formed on the top surface of the base material; and
   a plurality of first laminated stacks, wherein each of the plurality of first laminated stacks consists of a first high refractive index material layer formed on the first zinc oxide layer and a second zinc oxide layer formed on the first high refractive index material layer; and
a bottom anti-reflection film layer formed on a bottom surface of the base material, consisting of:
   a third zinc oxide layer formed on the bottom surface of the base material; and
   a plurality of second laminated stacks, wherein each of the plurality of second laminated stacks consists of a second high refractive index material layer formed on the third zinc oxide layer and a fourth zinc oxide layer formed on the second high refractive index material layer;
wherein the base material is manufactured by a floating zone crystal growth method.

2. The infrared anti-reflection film structure of claim 1, wherein a material of the first and second high refractive index material layers is silicon, germanium or gallium arsenide.

3. The infrared anti-reflection film structure of claim 1, wherein a thickness of the infrared anti-reflection film structure is between 2 micrometers to 4.5 micrometers.

* * * * *